(12) United States Patent
Romero Checa et al.

(10) Patent No.: US 7,340,948 B2
(45) Date of Patent: Mar. 11, 2008

(54) SYSTEM FOR SEALING VARIABLE GAPS FOR SCALE MODELS TESTED IN AN AERODYNAMIC TUNNEL

(75) Inventors: Eduardo Romero Checa, Madrid (ES); Jesús De Pablo Pérez, Madrid (ES)

(73) Assignee: Airbus Espana, S.L., Madrid (ES)

( * ) Notice: Subject to any disclaimer, the term of this patent is extended or adjusted under 35 U.S.C. 154(b) by 0 days.

(21) Appl. No.: 11/499,481

(22) Filed: Aug. 4, 2006

(65) Prior Publication Data
US 2007/0085280 A1    Apr. 19, 2007

(30) Foreign Application Priority Data
Oct. 11, 2005    (ES)    ................ 200502473

(51) Int. Cl.
*G01M 9/00*    (2006.01)
(52) U.S. Cl. ........................................ 73/147
(58) Field of Classification Search ............... 73/147
See application file for complete search history.

(56) References Cited
U.S. PATENT DOCUMENTS

| 4,372,159 A | * | 2/1983 | Doggett et al. | ............... 73/147 |
|---|---|---|---|---|
| 4,555,118 A | | 11/1985 | Saliger | |
| 4,836,035 A | * | 6/1989 | Tcheng et al. | ........... 73/862.61 |
| 5,024,581 A | | 6/1991 | Foucher | |

FOREIGN PATENT DOCUMENTS

| GB | 2 265 676 A | | 10/1993 |
|---|---|---|---|
| JP | 60164233 A | * | 8/1985 |

* cited by examiner

*Primary Examiner*—Edward Lefkowitz
*Assistant Examiner*—Jermaine Jenkins
(74) *Attorney, Agent, or Firm*—Klauber & Jackson L.L.C.

(57) ABSTRACT

The System for sealing for variable spaces comprising sealing means (3) for at least partially packing a space (4) between two pieces (1, 2) of a model, characterised in that at least a first piece (1) of the model presents, on its side facing a second piece (2) of the model, at least one recess (5) with a front end (5*a*) open and a back wall (5*b*), with the sealing means, comprising an elastic and flexible sealing body (3), being located in the front end (5*a*), and the back wall (5*b*) containing a set of spring elements (6, 7) among which are to be found coil springs or elastic strips, at least partially compressed by the sealing body (3) and which push the latter against the surface of the second piece (1*b*) of the model.

15 Claims, 7 Drawing Sheets

SYSTEM FOR SEALING VARIABLE GAPS FOR SCALE MODELS TESTED IN AN AERODYNAMIC TUNNEL

CROSS REFERENCE TO RELATED APPLICATIONS

The present application claims priority from Spanish Application Serial No. P200502473, filed on Oct. 11, 2005. Applicants claim priority under 35 U.S.C. §119 as to the said Spanish application, and the entire disclosure of said application is incorporated herein by reference in its entirety.

1. Field of the Invention

The present invention belongs to the field of systems for sealing intended for filling spaces and/or gaps that are variable in both shape and size, in test models in wind tunnels, for studying the aerodynamic properties of exterior surfaces of vehicles such as aircraft, cars, trains, etc. In particular, the invention applies to the sector of systems for sealing for spaces that are variable in shape and size existing between the surface of a moving element and the surface of a fixed element in test models in the aeronautical sector.

2. Prior Art of the Invention

In test models used in wind tunnels for the study of aerodynamic properties, it is very often necessary to seal spaces or gaps existing between different parts, such as might be the spaces existing between fixed elements and moving elements, as in the tail of the aircraft and the tail rudder.

The sealing is generally done with resin, foam, self-adhesive tape or rubber seals, which are positioned between the pieces sealing the space existing between them.

The drawback that these traditional systems for sealing have is that, in the event that one of the parts is moving, the space can change size and shape during the tests, and traditional methods of sealing do not permit any kind of adaptation to the variation of the space. Therefore, when a change takes place in the shape and/or size of the space, the seal will remain in its initial position and the sealing for that space will not be optimum.

In order to solve this drawback, the usual thing is to locate a fixed seal for each of the discrete positions in which the test is carried out, with the disadvantage that the seal has to be changed for each of the positions in each of the tests. This leads to an increase in the times needed for the tests, as well as an increase in raw materials and labour, with the added drawback that if the previous seal cannot be properly removed after each test, then it could influence the quality of the sealing for the next test, thus invalidating the results obtained.

A device was therefore desirable that would solve the problems existing in the prior art.

DESCRIPTION OF THE INVENTION

The present invention has the aim of overcoming the drawbacks of the prior art pointed out above by means of a system of sealing of spaces that are variable in size and shape in models tested in a wind tunnel. The objective of this invention is to place a seal in variable spaces which can adapt itself to a change in both size and shape of the space. In this way, it would not be necessary to redo the seal every time the geometry of the space changes since the seal adapts itself to the different shapes and sizes of the space.

Given that wind tunnel tests are very expensive to conduct, any saving in time during the assembly and dismantling of the model implies a major saving in money. This invention manages to reduce the time for changing from one test arrangement to another in different positions for being tested.

Said system for sealing comprises sealing means in order to at least partially seal a space existing between two pieces of a model, with one of these pieces able to be moving. In addition, the invention presents the following characteristics:

At least a first piece of the model is provided on its side facing a second piece of the model with a recess with a front end open and a back wall.

The sealing means responsible for sealing the space existing between the first and second piece consist of a sealing body made of an elastically flexible material, such as rubber or resin for example, inserted in the recess of one of the pieces, with a front part which emerges from the front end of that recess and rests on the surface of the other piece.

Fixed to the back wall of the recess is set of spring elements which are at least partially compressed by the sealing body in such a way that they push the sealing body against the wall of the second piece of the model, thereby successfully sealing the space existing between the two pieces.

For different embodiments of the invention, either an array of coil springs or a set of strips with at least one elastic section can be used as spring elements pushing against the sealing body, resting on the sealing body and pushing it against the piece thus sealing the space.

In order to attach the piece in which these spring elements are located to the back wall of the recess, different attachment methods can be used.

One of these methods consists of a piercing body located in the end opposite to that where pressure is exerted on the sealing body, which becomes nailed to the wall of the recess in which the spring element is located.

In another embodiment, the means of attachment consist of a threaded body which, instead of piercing, is screwed to the wall of the recess, thereby securing the spring element.

The spring element and the means of attachment can be produced in a single piece, or instead in two different pieces. In the latter case, if the spring element is a coil spring, it will grasp the attachment element, and if it is a flexible strip it will be joined to the attachment element by conventional means, for example by soldering.

Appearing in these figures are numerical references denoting the elements:
1 first piece
2 second piece
3 sealing body
4 space to seal
5 recess
5a front end of the recess
5b back wall of the recess
6 coil spring
6a piercing body
6b threaded body
7 strip
7a elastic section
7b piercing projection
7c support section
7d threaded projection

MODES OF EMBODIMENT OF THE INVENTION

Figure 1:
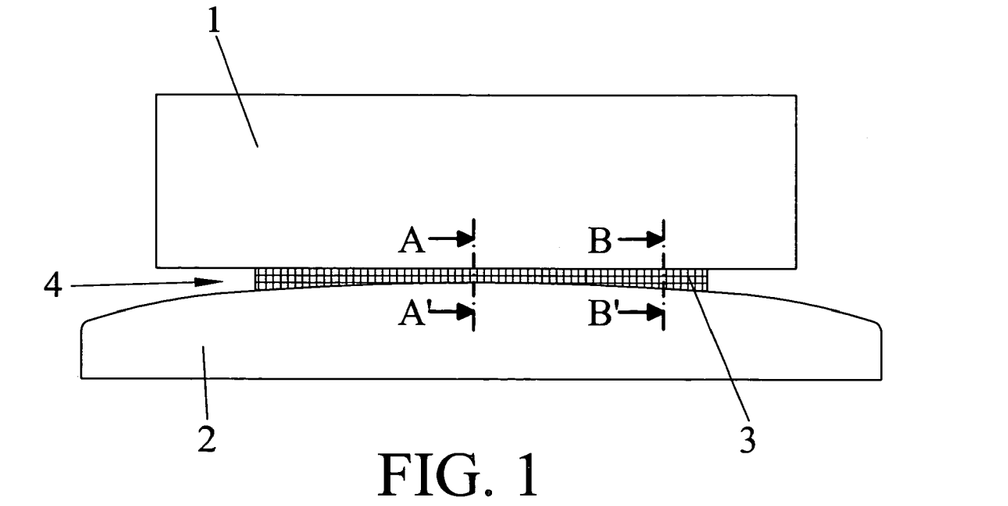
FIG. 1 is a diagrammatic view in upper plan showing a simplified example of a space between two pieces one of which has a sealing element, corresponding to the system of the present invention.
Figure 2:
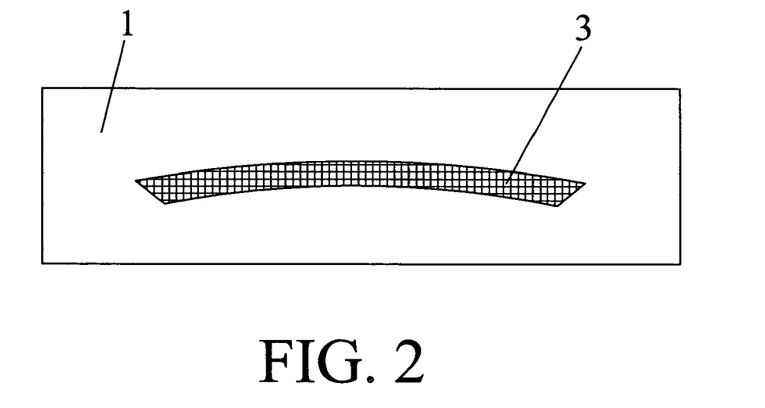
FIG. 2 is a front diagrammatic view of the piece comprising the sealing element shown in FIG. 1.

FIGS. 1 and 2 show a general arrangement of the invention, in which between a first piece 1, which remains fixed, and a second piece 2, whose position can be varied in different tests, there exists a space 4 which is sealed with a sealing body 3.

Said sealing body 3 is manufactured from a flexible material, such as for example rubber or resin, in order to be able to adapt itself to the change in shape of the space that is produced when the second moving piece 2 changes its position. In this way, the sealing keeps the space closed even though the latter changes shape or size owing to the movement of the pieces.

The time for changing one test arrangement for another when a space has to be sealed in different positions for testing is thus successfully reduced. In this way, it is not necessary to redo the sealing for each position to be tested since the seal adapts itself to the different shapes and sizes of the space. Because of all this, there is an evident saving in labour, work time and raw materials, which reduces the testing costs.

Figure 3:
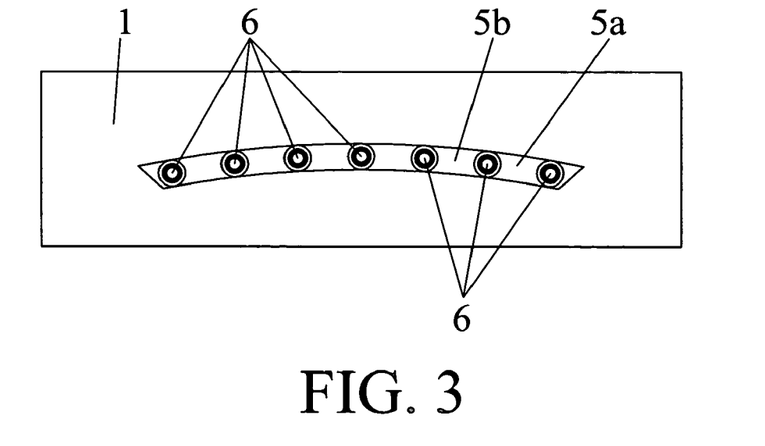
FIG. 3 is a front diagrammatic view of the piece shown in FIG. 2, without the sealing element, but with the spring elements.

In order to get this seal to adapt itself to the shape of the space, the sealing body 3 fits into a recess 5 made in the first or second piece 1 or 2 in such a way that the front part of the sealing body 3 emerges from the front end of the recess 5a. FIGS. 2 and 3 show a first embodiment of the recess 5, in which said recess 5 is made in the first piece 1, which is the fixed piece of the model.

In that embodiment, located in the back wall of the recess 5b, which is opposite to the front side 5a, are some spring elements 6, 7 which have the purpose of pushing the sealing body 3 against the surface of the second piece 2 of the model. In this way, the sealing body 3 is at all times in contact with the surface of the second piece 2 keeping the space 4 closed. Moreover, these spring elements 6, 7 permit the sealing body to adjust itself to variations in the size of the space 4, and the sealing body element 3 can also be used for different arrangements of the pieces 1 and 2, and different relative displacements between them, at all time keeping the said space 4 at least partially packed.

In order to exert the function of pushing on the sealing body against the surface of the piece, different spring elements can be used. In a first embodiment of these spring elements, they consist of an array of coil springs 6, as can be seen in FIGS. 3-7, 12-13. These coil springs 6 are attached to the first piece 1 in the back wall 5b of the recess 5 and they push the sealing body 3 against the surface of the second piece 2, keeping the space 4 sealed.

The advantage of this embodiment is the possibility of being able to adjust the width of the spring to the size of the gap of the recess 5. This provides greater stability in the attachment of the coil spring 6 to the interior of the recess 5, along with less possibility of the latter becoming displaced due to possible relative movements between the first piece 1 and the second piece 2. Moreover, as there exists a greater contour in the support surface of the coil spring 6 against the sealing body 3, the seal 4 of the space 5 existing between the first piece 1 and the second piece 2 will be more effective.

A second embodiment of the spring elements is illustrated in FIGS. 8-11B. The coil spring 6 is replaced by an elastic strip 7. Said elastic strip 7 possesses an elastic section 7a which exerts pressure on the sealing body 3 via a support section 7c. The advantage of using an elastic strip 7 in the invention, rather than a coil spring 6, is the greater simplicity of manufacture when dealing with very small sizes.

These spring elements 6, 7, both the coil spring 6 and the strip 7, must be attached to the back wall of the recess 5b, for which different attachment methods can be used.

Figure 4:
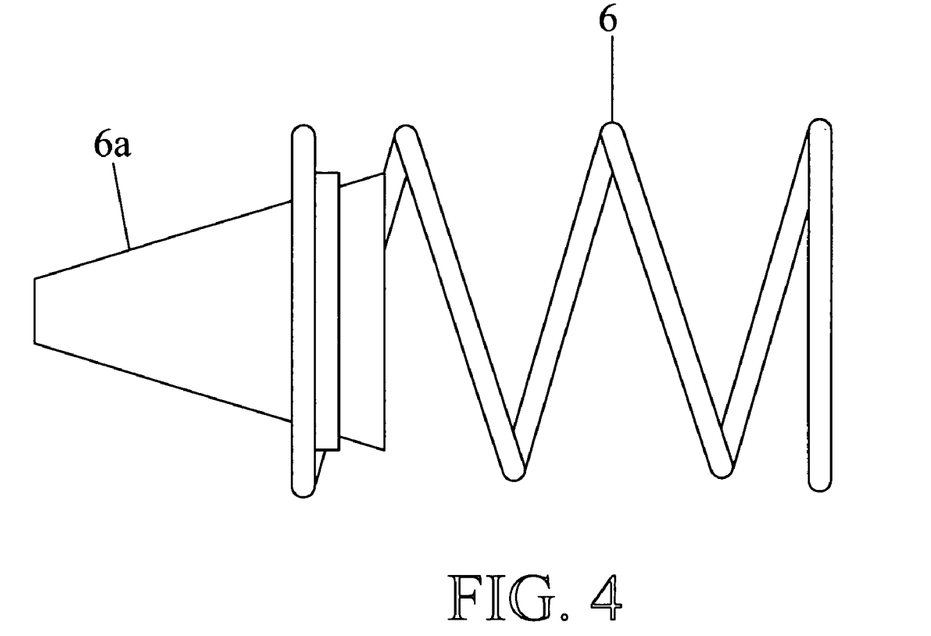
FIG. 4 is a lateral diagrammatic view of a first embodiment of a spring element with a first embodiment of the means of attachment to the back wall in the system of the present invention.
Figure 6:
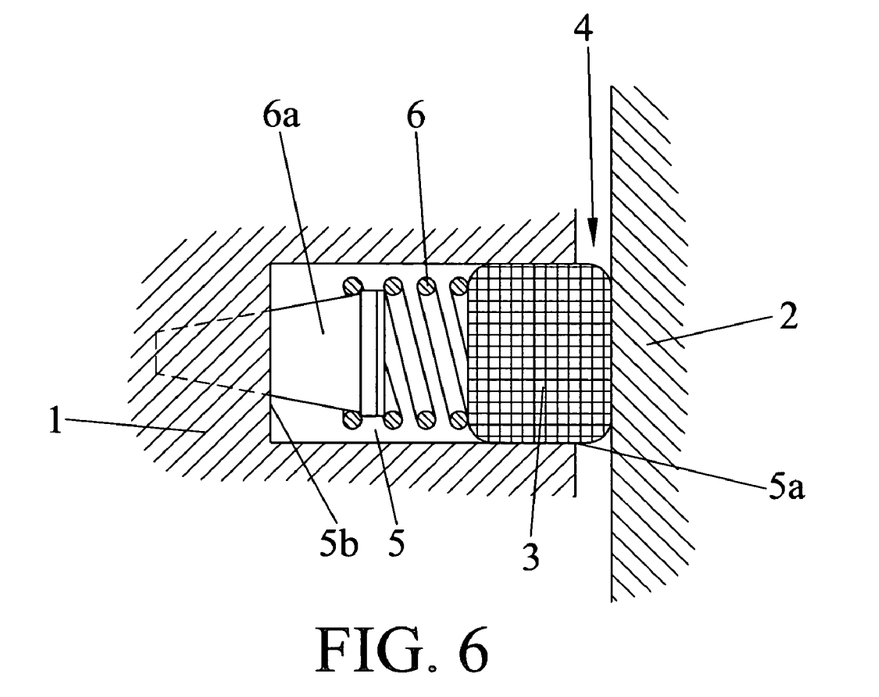
FIG. 6 is a diagrammatic view in lateral section through the line A-A' marked in FIG. 1.
Figure 7:
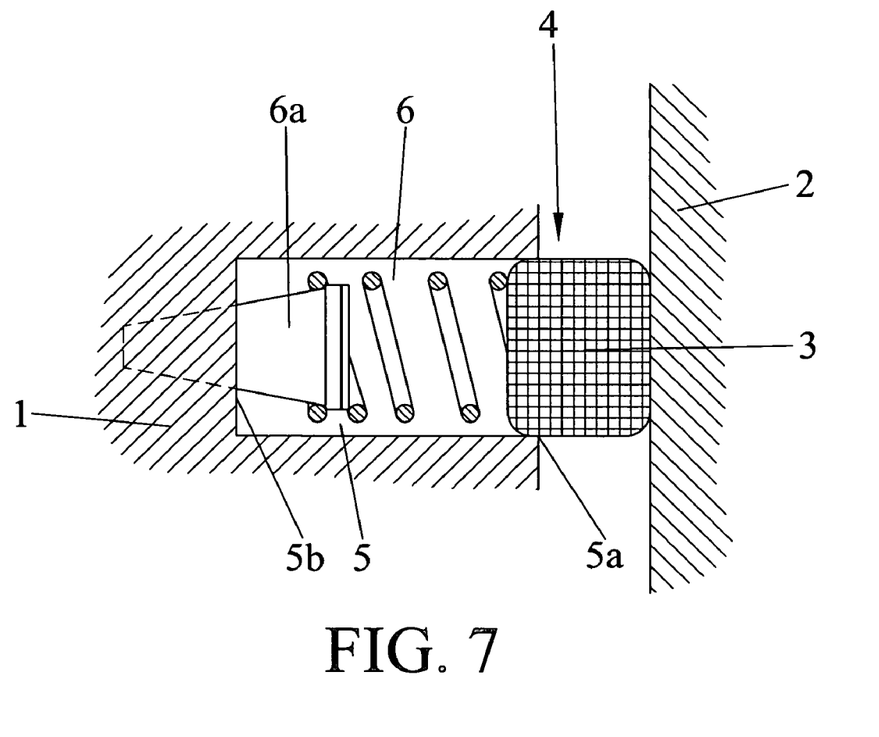
FIG. 7 is a diagrammatic view in lateral section through the line B-B' marked in FIG. 1.
Figure 8:
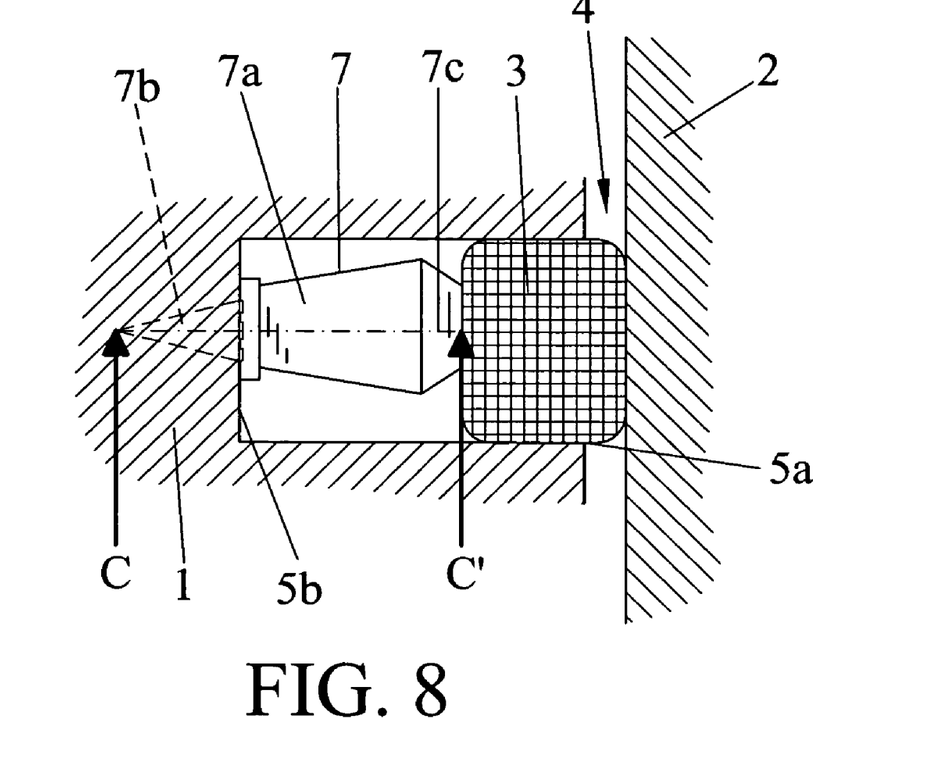
FIG. 8 is a diagrammatic view in lateral section corresponding to FIG. 6, presenting a second embodiment of the spring element.
Figure 9:
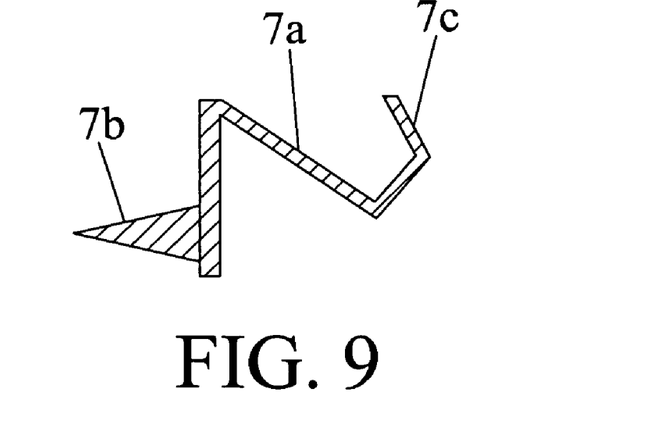
FIG. 9 is a diagrammatic view in lateral section through the line C-C' marked in FIG. 8, according to the second embodiment of the spring element in which the attachment of that spring element to the back wall is carried out by means of a piercing body.
Figure 10:
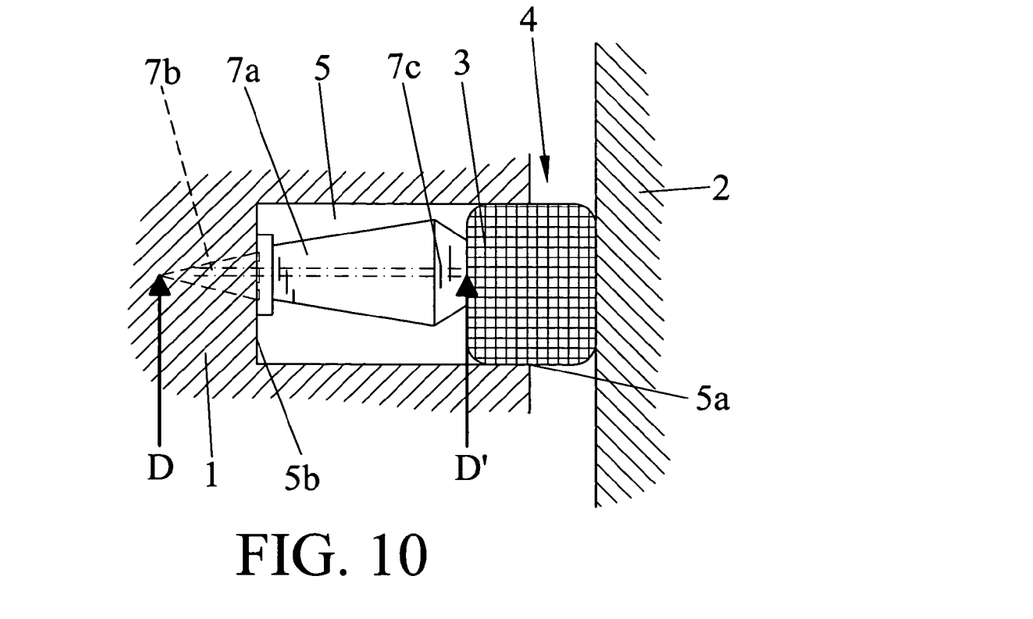
FIG. 10 is a diagrammatic view in lateral section corresponding to FIG. 7, presenting the second embodiment of the spring element shown in FIGS. 8 and 9.

FIGS. 4, 6 and 7 show a first embodiment of those means of attachment for the coil spring 6, in which a piercing body 6a is used, which is nailed to the back wall 5b, being retained therein. The advantage of this embodiment is its simplicity of manufacture and assembly and, therefore, lower cost.

Figure 5:
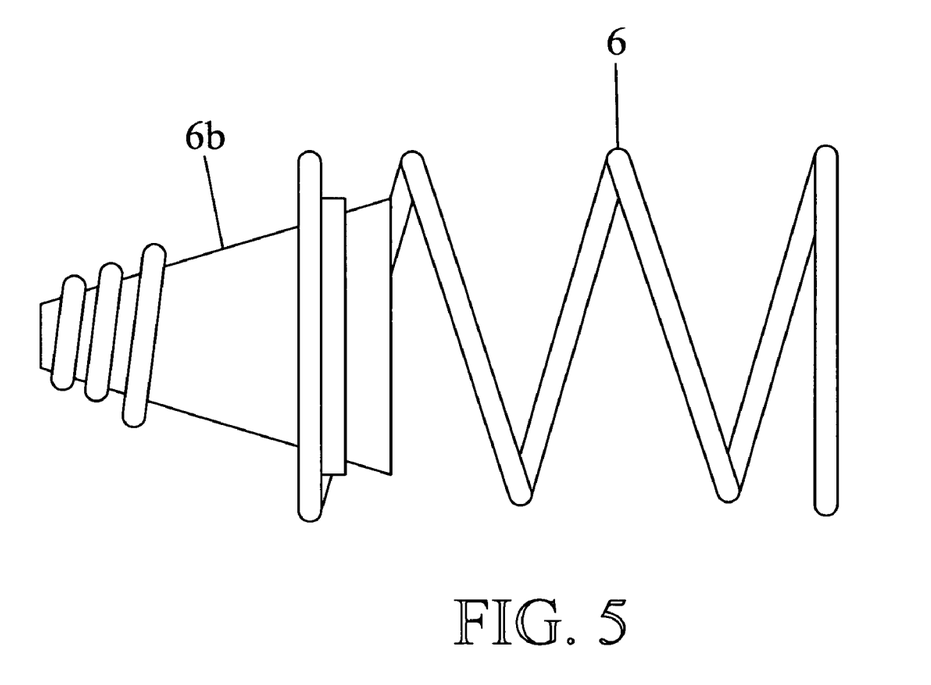
FIG. 5 is a lateral diagrammatic view of a first embodiment of a spring element with a second embodiment of the means of attachment to the back wall in the system of the present invention.

FIG. 5 shows a second embodiment of the attachment applied to the coil spring 6, in which a threaded body 6b, is used which is screwed to the back wall 5b and retained therein. The advantage of this second embodiment is that the attachment is firmer and more secure, which avoids possible damage to the back wall 5b which could be occasioned in the case of using the piercing body 6a and the latter is nailed too far into the back wall.

FIGS. 8, 9, 10 and 11A show a first embodiment of the means of attachment applied to the elastic strip 7 in which a piercing projection 7b is used. Said piercing projection 7b is nailed into the back wall 5b, being retained therein. The same advantages of simplicity of manufacture and assembly as were obtained with the attachment arrangement with a piercing body 6a for the coil spring 6 are obtained in with this attachment arrangement with a piercing projection 7b for the elastic strip 7.

Figure 11A:
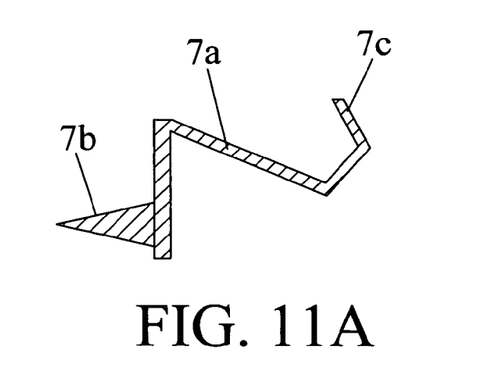
FIG. 11A is a diagrammatic view in lateral section through the line D-D' marked in FIG. 10, of the spring element, according to a second embodiment in which the attachment of the strip to the back wall is carried out by means of a piercing body.
Figure 11B:
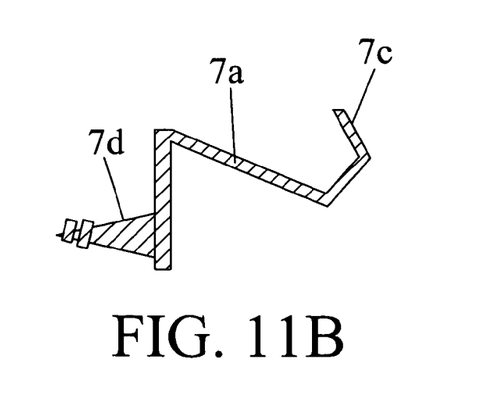
FIG. 11B is a diagrammatic view in lateral section through the line D-D' marked in FIG. 10, of the spring element, according to a second embodiment of the spring element in which the attachment of the strip to the back wall is carried out by means of a threaded body.

FIG. 11B shows a second embodiment of the means of attachment applied to the elastic strip 7 in which a threaded projection 7d is used. Said threaded projection 7d is screwed to the back wall 5b being retained therein and achieving an attachment that presents the same advantages of firmness and security as those offered by the embodiment by means of coil spring 6 and threaded body 6b.

The attachment elements 6a, 6b, 7b and 7d, and the spring elements 6 and 7, can be made in a single piece or instead two different pieces. FIGS. 4 and 5 show an embodiment of the union of the coil spring 6 and its attachment elements, whether these be the piercing body 6a or the threaded body 6b, in such a way that the coil spring 6 clutches the piercing body 6a or the threaded body 6b, thus producing the union between the two pieces. The advantage of the two-piece arrangement is the greater simplicity of manufacture and the possibility of being able to replace one of them in the event of deterioration rather than having to replace the complete unit.

In the same way, the strip 7 and its attachment elements, whether these be the piercing projection 7b or the threaded projection 7d, can be made in a single piece or instead be produced in two different pieces joined by conventional means, among which is to be found soldering. In this case, the said two-piece embodiment arrangement presents greater simplicity of manufacture.

Figure 12:
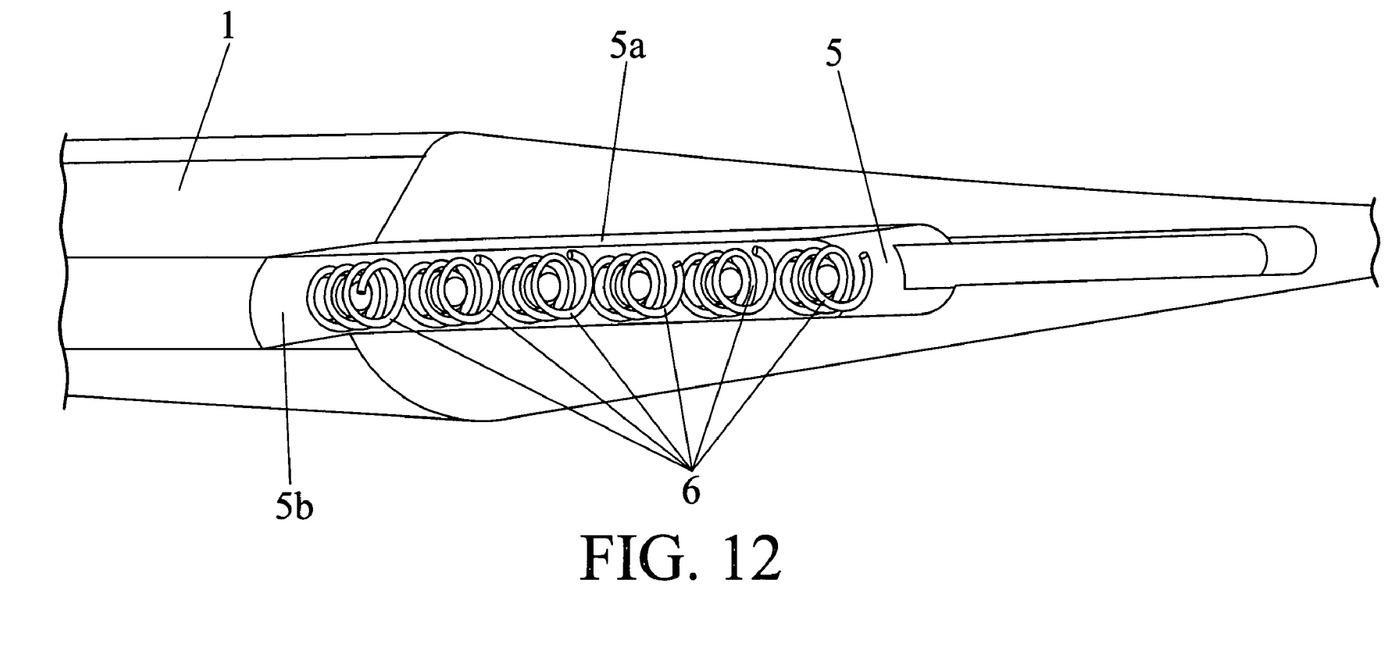
FIG. 12 is a lateral perspective view of a model of an elevator and the arrangement of the spring elements therein.
Figure 13:
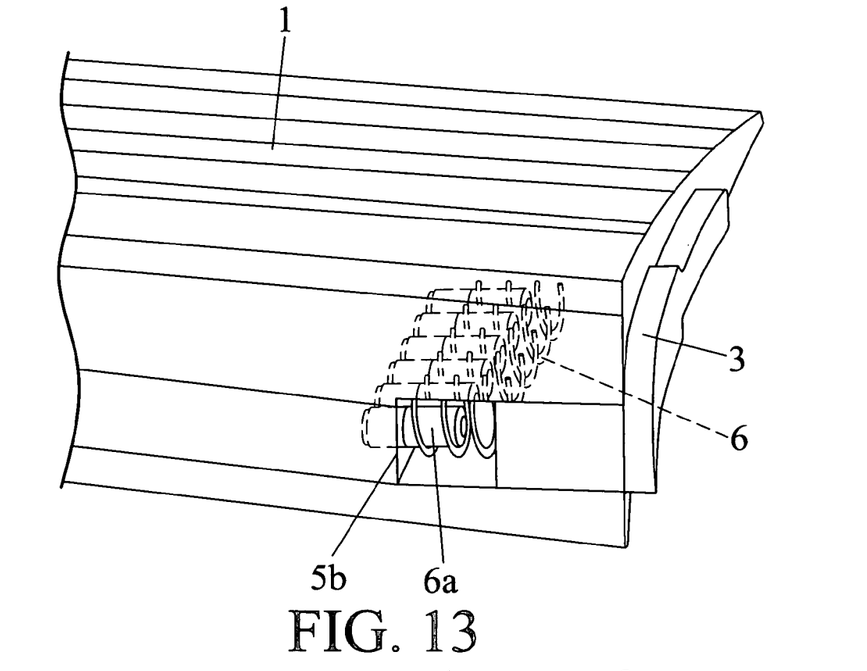
FIG. 13 is a partially sectioned front perspective view of the elevator with the sealing element introduced.
Figure 14:
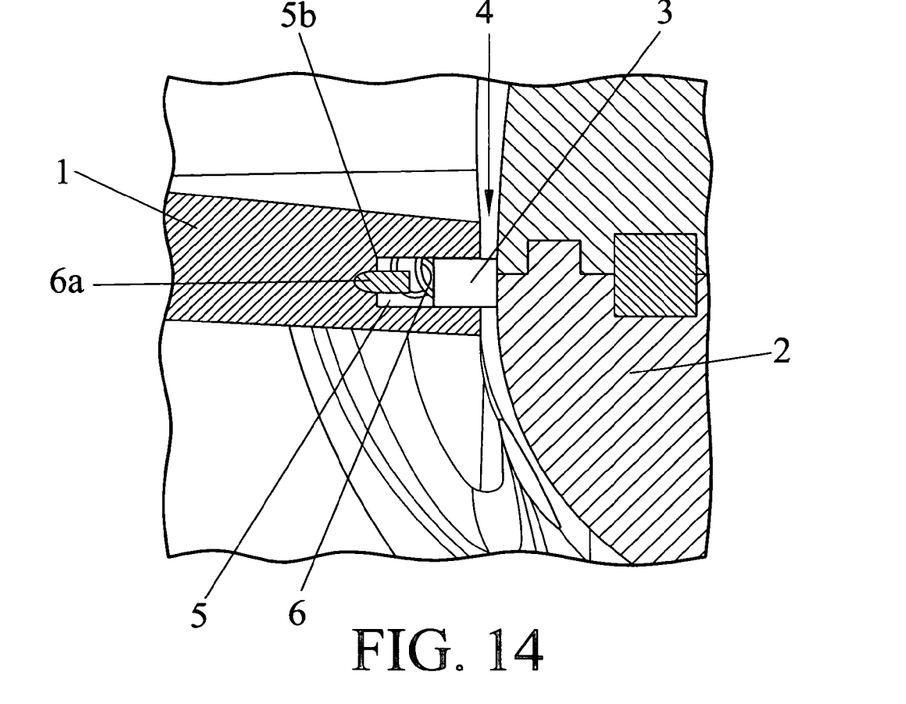
FIG. 14 is a partially sectioned perspective view of a model of an aircraft tail in which the elevator shown in FIGS. 12 and 13 is fitted.

FIGS. 12, 13 and 14 show the specific application of the invention to an elevator in an aircraft tail, according to a second embodiment of the recess 5, in which said recess is made in the moving piece, specifically in the elevator of the aircraft.

In the cases shown in the figures, the size of the elements of the invention is very small, and therefore they can be used for sealing spaces of the order of tenths of a millimeter, using for this springs of approximately half a millimeter in diameter.

The invention claimed is:

1. System for sealing variable gaps for scale models comprising sealing means for at least partially packing a space existing between two pieces of a model tested in an aerodynamic tunnel, wherein
   at least a first piece of said model is provided, on its side facing a second piece of said model, with at least one recess with a front end open and a back wall;
   the sealing means consist of a sealing body made of an elastically flexible material inserted in the recess with a front part which emerges from the front end of that recess;
   fixed to the back wall of the recess is a set of spring elements which are at least partially compressed by the sealing body in such a way that they push the sealing body against the surface of the second piece of the model.

2. System for sealing according to claim 1, wherein the spring elements comprise coil springs.

3. System for sealing according to claim 2, wherein provided in each coil spring is at least one piercing body which is nailed to the back wall of the recess.

4. System for sealing according to claim 3, wherein the coil spring clutches a section of the piercing body.

5. System for sealing according to claim 3, wherein the coil spring and the piercing body are a single piece.

6. System for sealing according to claim 2, wherein provided in each coil spring is a threaded body threaded in said back wall of the recess.

7. System for sealing according to claim 6, wherein the coil spring clutches a section of the threaded body.

8. System for sealing according to claim 6, wherein the coil spring and the threaded body are a single piece.

9. System for sealing according to claim 1, wherein the spring elements comprise strips, each of which consists of at least one elastic section which rests on the sealing body.

10. System for sealing according to claim 9, wherein provided in each strip is at least one piercing projection nailed to the back wall of the recess.

11. System for sealing according to claim 10, wherein the strip and the piercing projection are a single piece.

12. System for sealing according to claim 9, wherein provided in each strip is at least a threaded projection threaded in the back wall of the recess.

13. System for sealing according to claim 12, wherein the strip and the threaded projection are a single piece.

14. System for sealing according to claim 1, wherein the first piece provided with the recess is the fixed piece of the model.

15. System for sealing according to claim 1, wherein the first piece provided with the recess is the moving piece of the model.

* * * * *